United States Patent [19]

Norcross

[11] 3,970,330

[45] July 20, 1976

[54] KICKSTAND BASE FOR TWO-WHEELED VEHICLES

[75] Inventor: Barry Norcross, West Hollywood, Calif.

[73] Assignee: Larry K. Myers, Singapore, Singapore

[22] Filed: Sept. 20, 1974

[21] Appl. No.: 507,694

[52] U.S. Cl. .............................................. 280/301
[51] Int. Cl.² ........................................... B62H 1/02
[58] Field of Search ............ 280/293, 294, 295, 301

[56] References Cited
UNITED STATES PATENTS

| | | | |
|---|---|---|---|
| 571,979 | 11/1896 | Otto | 280/301 |
| 862,945 | 8/1907 | Tiffany | 280/301 |
| 3,712,640 | 1/1973 | Shipman et al. | 280/301 |

FOREIGN PATENTS OR APPLICATIONS

| | | | |
|---|---|---|---|
| 910,507 | 3/1954 | Germany | 280/301 |
| 1,104,843 | 4/1961 | Germany | 280/293 |
| 209,486 | 4/1940 | Switzerland | 280/293 |
| 106,365 | 8/1924 | Switzerland | 280/301 |

Primary Examiner—M. H. Wood, Jr.
Assistant Examiner—John P. Silverstrim
Attorney, Agent, or Firm—Wm. Jacquet Gribble

[57] ABSTRACT

A removable foot adapted to friction fit on the ground-contacting shank of a conventional cycle kickstand has a base with a top surface from which a sleeve projects, and a sole that is larger than the ground end of the kickstand. The sleeve fits on the shank and is angled with respect to the foot sole to contact properly the ground for support in accordance with the angle or shape of the kickstand shank.

1 Claim, 5 Drawing Figures

KICKSTAND BASE FOR TWO-WHEELED VEHICLES

BACKGROUND OF THE INVENTION

Kickstands, either pivoted or folding, have been used on both bicycles and motorcycles for years. In many instances these stands adequately support the cycle at rest in upright configuration. However, in cases where the support area is soft or uneven, as in plowed ground, mud, sandy soil, or even sun-warmed asphalt, the conventional kickstand shank penetrates the support area, toppling the cycle.

The present invention obviates the necessity of finding a leaning place for a cycle when such ground conditions as those set forth above are encountered. The presently inadequate kickstand is made adequate by its combination with the simple, easily applied base of the invention that increases the area of the kickstand in contact with the ground, effectively eliminating shank penetration and change in the attitude of the bicycle or motorcycle at rest. Similar benefit is afforded other vehicles needing a prop to remain upright at rest.

SUMMARY OF THE INVENTION

The invention contemplates, in a vehicle with a pivoted or folded kickstand, the combination which comprises a kickstand shank terminating in a ground-contacting end, and a support base having a foot from which a sleeve projects to engage the shank. The foot sole is larger in area than the shank end to engage the support surface encountered. Preferably the sleeve is at an angle to the sole to accommodate the normal bend of the kickstand shank. The sleeve is friction-fitted to the shank. In certain instances the angle is almost 90 degrees. In other instances the sleeve extends almost parallel to the sole. In the preferred embodiment the sleeve has an entry axis for the shank at almost 90° to the sole, and its inner wall makes a press-fit with the shank.

Each support base may have attachment means thereon for securing it to the vehicle after removal from the kickstand shank. One such means is a Velcro strip on the support base of the invention and a conncommitent strip or patch on the vehicle.

The support base of the invention is inexpensively made from conventional materials and is simple to combine with existing cycle vehicles and other recreational vehicles where stability at rest is achieved by a small, articulated support or prop.

These and other advantages of the invention are apparent from the following detailed description and drawing.

BRIEF DESCRIPTION OF THE DRAWING

In the separate views like parts are identified by like reference characters.

DESCRIPTION OF THE PREFERRED EMBODIMENTS

Figure 1:
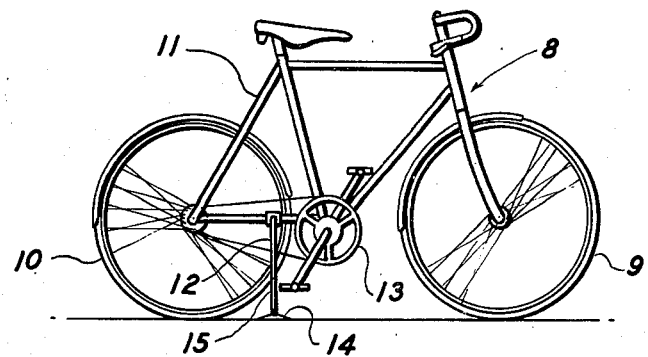
FIG. 1 is a side elevation of a two-wheeled vehicle combined with the support base of the invention.

FIG. 1 illustrates the use of the invention and shows a conventional bicycle at rest. The bicycle 8 has a front wheel 9, a rear wheel 10 and a frame 11. A pivoted kickstand 12 near the front sprocket 13 is adapted to support the bicycle at rest, forming with the two wheels a three point support system.

A kickstand support base 14 fixed to a shank 15 of the kickstand increases the area contacting the ground or other support surface. The support base 14 has a faceted foot 16 with a sole 17, shown in more detail in FIGS. 2 and 3, wherein the top of the faceted foot 17 is seen to have a half-sleeve 18 in which the shank 15 of the kickstand is engaged. Preferably the fit between the shank and the sleeve is a light press-fit such that the support base 14 may be removed, if necessary, after each use. In most instances clearance between the kickstand and the frame and wheel is small when the kickstand is folded or pivoted up away from ground contact.

Figure 3:
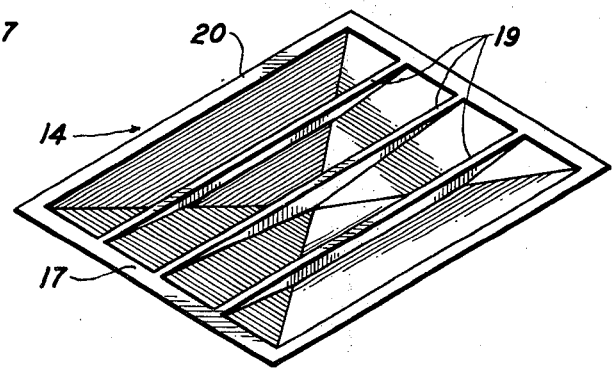
FIG. 3 is a bottom perspective view of the embodiment of FIG. 2.

As can be seen from FIG. 3, the sole 17 of the base support is substantially hollow, with the hollow being defined by the underside of the facet walls of the foot. Ribs 19 across the hollow reinforce the base and afford ground contact area, as does the peripheral flat 20 of the sole.

The press-fit between the half-sleeve 18 and the kickstand shank 15 is in part achieved by the slope of the facet 16A, which, in the direction of shank thrust, is at an angle to the sleeve inner wall such that further thrust of the shank into the sleeve binds the shank between the sleeve loop wall 21 and the facet.

Figure 2:
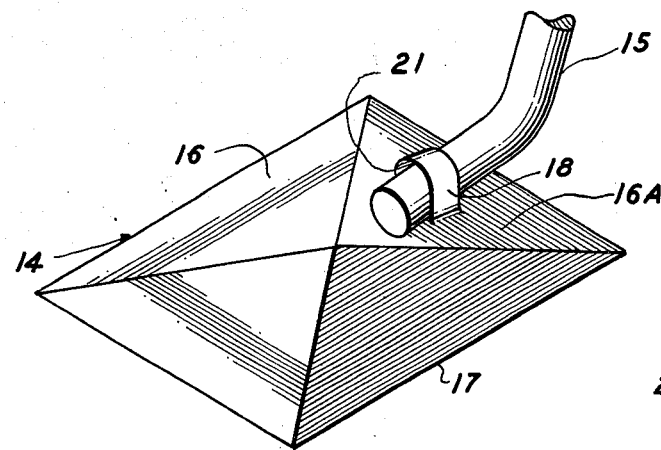
FIG. 2 is a perspective view, partly broken away, of an embodment of the invention having a shallow pyramidal shape.

The embodiment of FIGS. 1–3 may be molded, stamped or vacuum formed, depending upon the material from which it is made. In any case, production of the support base is inexpensive and accurate, lowering the ultimate selling price to the consumer.

Figure 4:
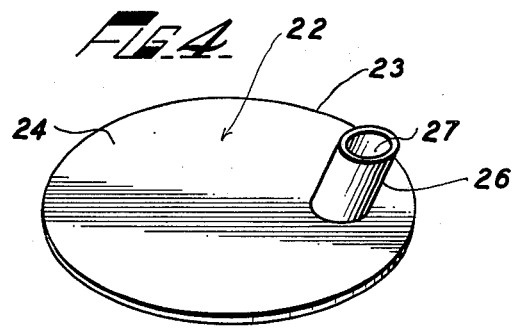
FIG. 4 is a top perspective view of an alternate embodiment of the invention.
Figure 5:
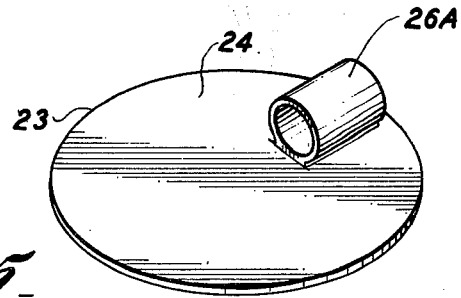
FIG. 5 is a top perspective view of a further alternate embodiment of the invention.

The embodiments of FIGS. 4 and 5 are equally inexpensive to fabricate. As can be seen from FIG. 4, a support base 22 comprises a round foot 23 with a flat sole (not shown), a flat top 24 and a substantially vertical sleeve 26 fixed to top 24 and displaced from the center of the foot 23. The bore 27 of the sleeve has a diameter selected to press-fit with a kickstand shank of a particular manufacture, since shank dimensions and attitudes are not standard in the industry. Because of size and shank angle variations the sleeve may be oriented with respect to the base support foot as shown in the embodiment of FIG. 5, wherein the bore of sleeve 26A is substantially parallel to the sole of the disc-like foot 23, to combine with any one of several "Schwinn" bicycle styles. As in the previously described embodiment, the sleeve is fixed to the foot off-center to aid clearance in case the kickstand is folded up with the base attached and to enlarge the support area when the cycle is at its three point rest position.

The embodiments of FIGS. 4 and 5 lend themselves to conventional metal fabrication techniques, although plastic molding methods are not precluded by the configuration. The sleeves 26 and 26A may be fixed to the foot by spotwelding, soldering or brazing. Alternatively, the sleeve and foot disc may be integrally formed by injection or sand molding in plastic or metal.

While the illustrative material set forth above has presented the invention in combination with a conventional bicycle, it is obvious that the utility of the invention is not so limited. It may be combined with motorcycles, snowmobiles and many other vehicles, powered or unpowered, that rely on a movable leg or stand for stability when at rest. Several embodiments have been disclosed, but other embodiments and variations within the scope of the invention will occur to those skilled in the art. It is therefore desired that the invention be measured by the attached claims to invention rather than by the purely illustrative disclosure herein.

I claim:

1. A support base for a vehicle having a pivoted or folding kickstand, the combination comprising a ground-contacting kickstand shank, a support base foot exceeding the contact area of the kickstand shank, said base foot having a faceted top defining a shallow hollow ground-contacting sole with reinforcing ribs extending across said hollow sole, a shank-receiving sleeve on the upper side of the foot having an entry axis at an angle to the ground-contacting sole of the base foot, said sleeve further having an inner wall making a removable friction fit with the outer wall of the shank.

* * * * *